US012044057B1

(12) United States Patent
Huddleston et al.

(10) Patent No.: US 12,044,057 B1
(45) Date of Patent: Jul. 23, 2024

(54) DOOR PUSHER APPARATUS AND RELATED METHODS FOR SLIDING DOOR PANELS

(71) Applicant: Wincore Window and Door Company, LLC, Parkersburg, WV (US)

(72) Inventors: Nathan Huddleston, Lowell, OH (US); Jimmie Dale Daniels, Jr., Harrisville, WV (US)

(73) Assignee: Wincore Window and Door Company, LLC, Parkersburg, WV (US)

( * ) Notice: Subject to any disclaimer, the term of this patent is extended or adjusted under 35 U.S.C. 154(b) by 0 days.

(21) Appl. No.: 18/452,295

(22) Filed: Aug. 18, 2023

(51) Int. Cl.
*E05F 5/00* (2017.01)
*E05F 17/00* (2006.01)
*E06B 3/46* (2006.01)

(52) U.S. Cl.
CPC .............. *E05F 17/00* (2013.01); *E05F 5/003* (2013.01); *E05F 2017/007* (2013.01); *E06B 3/4636* (2013.01)

(58) Field of Classification Search
CPC ..... E05F 17/00; E05F 5/003; E05F 2017/007; E06B 3/4636
USPC .......... 49/125, 126, 127, 128, 129, 130, 458
See application file for complete search history.

(56) References Cited

U.S. PATENT DOCUMENTS 4,107,878 A * 8/1978 Baus ........................ A47K 3/34 49/504
4,180,942 A * 1/1980 Saucier ..................... E06B 3/28 49/419
4,726,147 A * 2/1988 Beske ................... E06B 7/2312 49/458
5,233,724 A * 8/1993 Lei tert ................... E05F 5/003 160/202
6,141,907 A * 11/2000 Parazader ............. E05F 15/665 49/121
6,161,334 A * 12/2000 Goodin ................. E06B 9/0676 49/55
7,174,944 B1 * 2/2007 Clark ...................... E05D 15/08 49/424
7,827,734 B2 * 11/2010 Cox .......................... E06B 5/12 49/63
8,297,334 B2 * 10/2012 Chu .......................... E06B 9/36 160/202
8,869,453 B1 * 10/2014 Jordan .................. E06B 3/4407 49/404
8,991,099 B1 * 3/2015 Erskine ................... E05D 15/50 49/127
10,180,015 B1 * 1/2019 Grainger ................. E05D 15/22
11,441,350 B1 * 9/2022 Jordan ................ E06B 3/26301
2004/0049984 A1 * 3/2004 Pfaff ....................... E05F 17/00 49/73.1
2006/0248803 A1 * 11/2006 Kirk ...................... E06B 3/9642 49/458
2011/0072724 A1 * 3/2011 Scruggs .................. E05D 15/08 49/129

(Continued)

*Primary Examiner* — Jerry E Redman
(74) *Attorney, Agent, or Firm* — Goodwin Procter LLP

(57) ABSTRACT

A door pusher for a multi-rail sliding door is described. An example door pusher includes (i) a mounting portion secured to the at least one stile of the a sliding door panel using a fastener aligned with a sliding direction of the sliding door panel, and (ii) a bumper portion configured to contact an edge of an adjacent sliding door panel.

17 Claims, 8 Drawing Sheets

(56) References Cited

U.S. PATENT DOCUMENTS

| | | | | |
|---|---|---|---|---|
| 2015/0075075 | A1* | 3/2015 | Erskine | E05D 7/00 49/188 |
| 2016/0186484 | A1* | 6/2016 | Nielsen | E06B 3/44 49/458 |
| 2023/0313586 | A1* | 10/2023 | Hamm | E06B 3/02 49/404 |

* cited by examiner

DOOR PUSHER APPARATUS AND RELATED METHODS FOR SLIDING DOOR PANELS

TECHNICAL FIELD

This disclosure generally relates to sliding door panels and, more specifically, to a door pusher for multi-track sliding door panels and related methods for making and using the same to improve the functionality, durability, and aesthetic appearance of the sliding door panels.

BACKGROUND

Multi-track sliding door panels can feature three or more expansive panels that slide open easily and intuitively, stacking against each other or tucking away out of sight into a wall pocket. Large door panels can travel to one side or part in the middle, creating wide openings that expand the living space. Because of their stacking feature, multi-track sliding door panels create a seamless transition between indoor living spaces and patios, decks, or garden rooms.

In a typical configuration, the multi-track sliding door panels feature elements known as bumpers that prevent the complete overlap of the panels when the multi-track sliding door is fully collapsed (e.g., when the multi-track sliding door is in its fully open position). In addition, these elements can assist with the opening operation of the sliding panels. For example, when the end panel of the sliding door (referred to herein as the "first" panel) is pushed from its fully closed position towards its fully open position, the first panel travels over a portion of the immediately preceding panel (the "second" panel) until it contacts the bumper attached to the second panel. The opening motion now pushes both first and second panels towards the open position and over a third panel until the second panel contacts the bumper of the third panel. This cascading effect eventually pushes all the panels towards the fully open position even though force is applied only to the first panel.

In a typical design configuration, the bumper element is a piece of metal or other durable material (e.g., hardened plastic, wood, etc.) mounted on the rail of the door panel with the bumper's base positioned parallel to the sliding motion of the panel. Therefore, when the first panel traverses over the second panel during the opening motion, the vertical side of the first panel (e.g., the panel's stile) contacts the rail mounted bumper of the second door panel. Thus, the force applied to the first panel is transferred via the rail mounted bumper of the second panel to the second panel. As a result, both panels start moving together in a synchronous motion. This process repeats until all the panels are fully collapsed or stacked.

Despite their functionality, rail mounted bumpers have several disadvantages. First, the alignment of the bumper element with its base being parallel to the sliding motion means that the fasteners securing the bumper on the rail can be subjected to shear stress. This is because the fasteners are positioned perpendicular to the applied force on the rail mounted bumper. Over time, this shear stress can be detrimental to the rail mounted bumper, its fasteners, and the panel's mounting surface, and may result in premature failure. Second, rail mounted bumpers limit the overlapping length of the panels in the fully open position. This is because the overlapping length can be limited by the location of the rail mounted bumper and the dimensions of the bumper. Thus, panels with rail mounted bumpers may have non-overlapping portions that occupy substantial real estate.

Finally, the rail mounted bumpers, being located on the face of the panels, are highly visible, which may not be aesthetically desirable.

Therefore, there is a need for a door pusher configuration that has the functionality of rail mounted bumpers but none of their drawbacks.

SUMMARY

To address the aforementioned shortcomings, a door pusher for multi-track sliding doors and a method for making the same is provided. In certain examples, the door pusher includes a bumper portion and a mounting portion that are directly attached and secured to the panel's stile via an interlock and a common fastener. The door pusher described herein is positioned such that the fastener is advantageously oriented parallel to the direction of the panel's travel. In some embodiments, the interlock features a cavity in which the mounting portion of the door pusher slides into position prior to being secured with the fastener. Therefore, and according to some embodiments, the mounting portion of the door pusher is attached across or on a vertical edge of the door panel (e.g., attached to a stile of the panel) while the bumper portion extends sideways towards an external side surface of the panel. As a result, a side profile of the bumper portion of the door pusher is substantially smaller than that of a rail mounted bumper whose entire length is on the external side surface of the door panel. As such, the door pusher disclosed herein is less visible, and thus, more aesthetically pleasing than a rail mounted bumper. Further, the disclosed door pusher allows for a larger overlap between the stacked panels, which reduces the overall length of the collapsed sliding door and permits a larger opening when the panels are fully opened. Additionally or alternatively, because the fastener securing the door pusher can be positioned parallel to a force exerted on the panel during the opening movement, there is limited or no shear stress applied to the fastener, which substantially improves the longevity of the door pusher installation.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to some embodiments by way of illustration only. It should be noted that from the following discussion alternative embodiments of the structures and methods disclosed herein will be readily recognized as viable alternatives that may be employed without departing from the principles of the present disclosure.

Reference will now be made in detail to specific embodiments, examples of which are illustrated in the accompanying figures. It should be noted that wherever practicable similar or like reference numbers may be used in the figures and may indicate similar or like functionality. The figures depict embodiments of the disclosed door pusher apparatus and its installation methods for purposes of illustration only. One skilled in the art will readily recognize from the following description that alternative embodiments of the structures and methods illustrated herein may be employed without departing from the principles described herein.

Figure 1:
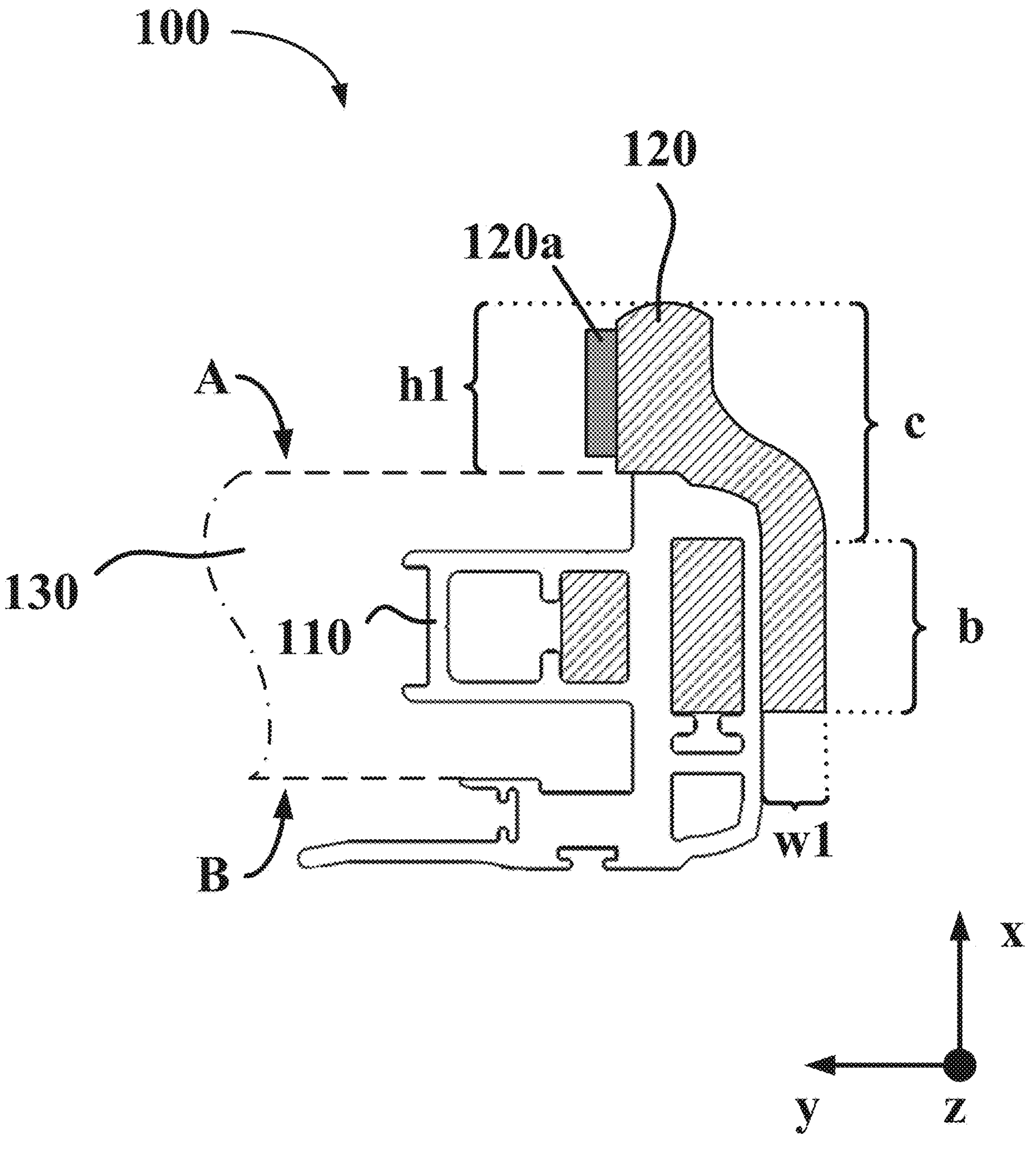
FIG. 1 is a top view of an apparatus that includes at least a door pusher with a mounting portion and a bumper portion, according to some embodiments.

According to some embodiments, FIG. 1 is a top, cross-sectional view of an apparatus 100 that includes a door pusher 120 connected via an interlock 110 to a panel stile 130 of a sliding door. According to some embodiments, the door pusher 120 includes a mounting portion b and a bumper portion c. Mounting portion b is secured to the interlock 110 and/or the panel stile 130 via a fastener (not shown in FIG. 1). Panel stile 130, which is only partially shown in FIG. 1, is designated with dashed lines. The panel stile 130 and/or the interlock 110 can be part of the panel assembly, which can further include, for example, a main or central panel material (e.g., glass), top and bottom rails, an additional stile on an opposite side of the panel, and other components not shown in FIG. 1 for simplicity.

As depicted in FIG. 1, the door panel is configured to move along the y-direction. For example, to extend the sliding multi-panel door (e.g., to close the sliding multi-panel door), the panel assembly moves in the y-direction. Conversely, to open the sliding multi-panel door, the panel moves in the opposite direction. Accordingly, and for the purposes of this disclosure, the panel has an external surface A and an internal surface B. By way of example and not limitation, the external surface A may be a surface of the panel that is exposed to an outdoor space whereas the internal surface B may be a surface of the panel that is exposed to an indoor space. As shown in FIG. 1, external surface A and internal surface B are on opposite sides of the panel.

According to some embodiments, the bumper portion c of the door pusher 120 extends (e.g., substantially in the x-direction) from the mounting portion b to a region beyond a plane defined by the external surface A of the panel. This can allow the bumper portion c to come into contact with an adjacent door panel, as described herein. In some examples, a height h1 of door pusher 120 along the x-direction and beyond the plane defined by the external surface A of the panel can be from about 0.5 inches (12.7 mm) to about 1 inch (25.4 mm), or about 0.75 inches (19.05 mm). In some examples, bumper portion c can cover a side portion of interlock 110 and/or can overlap slightly, or not at all, with the external surface A of the panel. According to some embodiments, the arrangement can allow multiple panels to be stacked closer together as will be discussed in detail below. The bumper portion c further includes a member **120*a* that functions as a cushion when an adjacent panel is pushed against the bumper portion c of the door pusher 120 during the opening of the multi-panel sliding door. A width w of door pusher 120 near a side edge of interlock 110** can be, for example, from about 0.25 inches (6.4 mm) to about 0.5 inches (12.7 mm), or about 0.375 inches (9.5 mm).

According to some embodiments, door pusher 120 can be made of or include a cast alloy, such as a zinc (Zn) cast alloy; however, this is not limiting, and door pusher 120 can be made from any suitable material, including one or more metals, polymeric materials, or any combination thereof. Further, member **120*a* can be made of a cushioning material (e.g., rubber, an elastomer, silicone, Neoprene, ethylene propylene diene terpolymer (EPDM), and the like) that provides acceptable cushioning performance and durability. In some embodiments, mounting portion b and bumper portion c of door pusher 120 can be made from the same or different materials. For example, door pusher 120 can have a unitary construction. In some embodiments, one or more portions of interlock 110 can be designed to fit into or around the panel stile 130. In some embodiments, the interlock 110 functions as an interface between the panel stile 130 and the door pusher 120. For example, interlock 110 can facilitate the attachment of the door pusher 120 to the panel. In certain examples, door pusher 120 may be designed around the interlock 110 to achieve a desired fit, or the other way around. Accordingly, the door pusher 120 (e.g., including mounting portion b and/or bumper portion c) may have grooves, cavities, protrusions, tabs, or other surface features that fit into or are conformed with respective surface features of the interlock 110**, to achieve an appropriate fit or surface contact.

Figure 2:
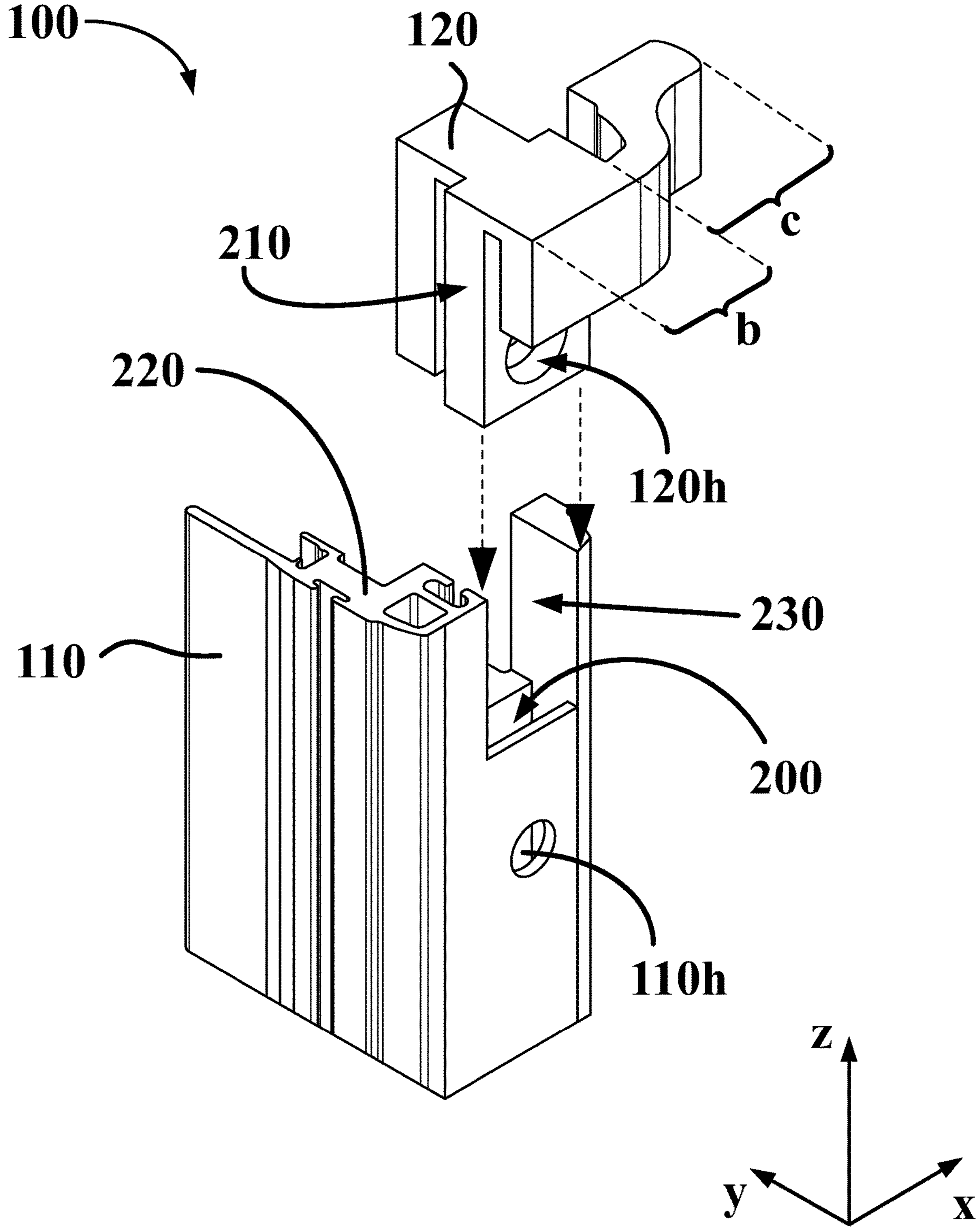
FIG. 2 is an isometric view of a door pusher prior to installation, according to some embodiments.

According to some embodiments, FIG. 2 is an isometric view of the apparatus 100 showing door pusher 120 prior to installation. In the depicted example, the mounting portion b of the door pusher 120 is designed to slide into the interlock 110 (e.g., in the z-direction) so that holes **120*h* and 110*h* are respectively aligned with one another when the door pusher 120 is properly seated. In other words, holes 120*h* and 110*h* become self-aligned when the door pusher 120 is installed in interlock 110. The interlock 110 includes at least one internal cavity 200 configured to receive at least one tab 210 of the door pusher 120. This helps provide a secure fit between the door pusher 120 and the interlock 110. The interlock 110 includes a cutout or slot 230 that allows the door pusher 120 to slide into the interlock 110 and sit beneath a top edge 220 of the interlock 110. A fastener can be inserted through holes 120*h* and 110*h* to secure door pusher 120 to interlock 110 and/or the panel stile (e.g., panel stile 130). The panel stile and the fastener are not shown in the isometric view of FIG. 2**.

Figure 7:
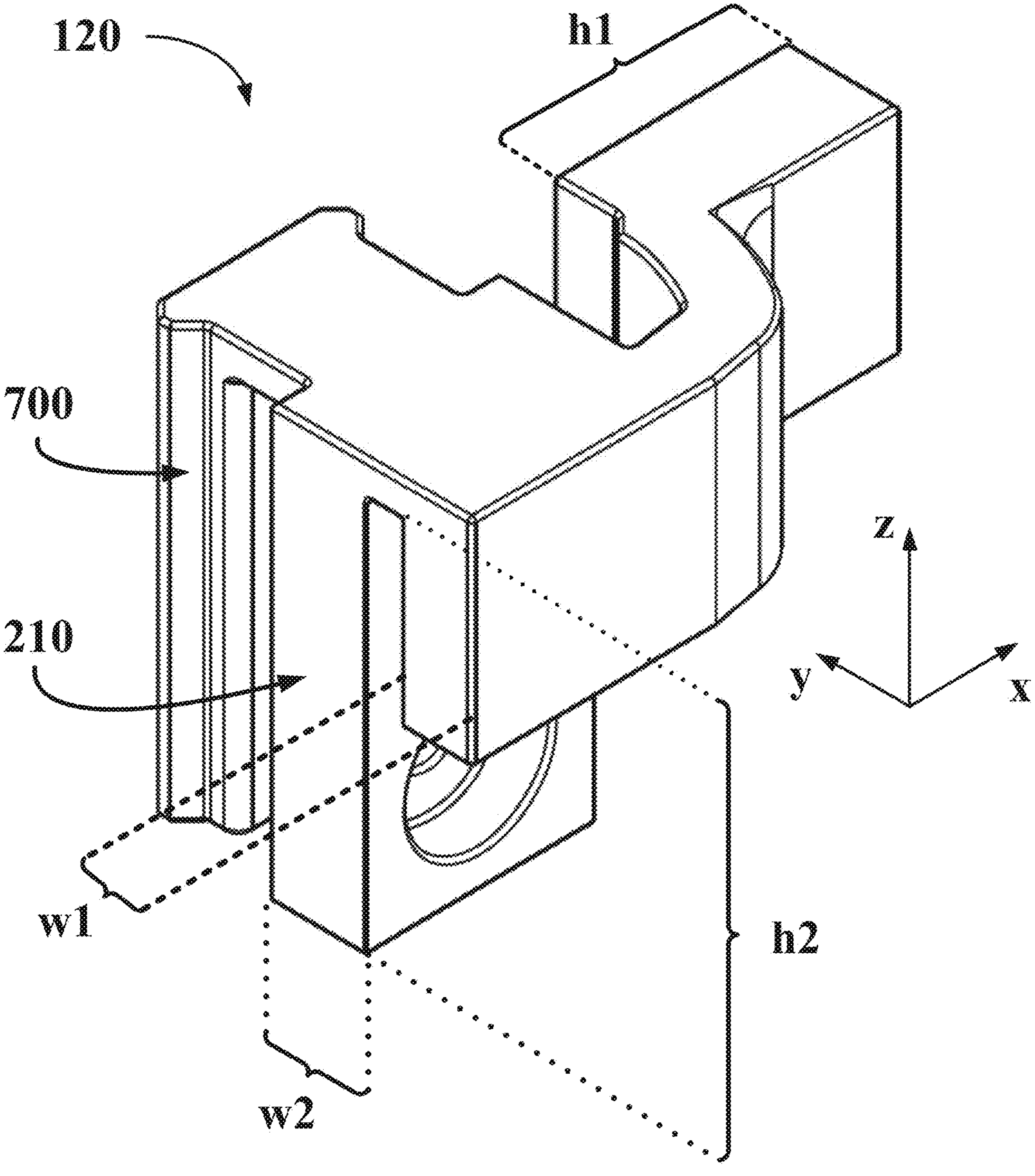
FIG. 7 is a magnified isometric view of a door pusher, according to some embodiments.

Referring to FIG. 7, in some embodiments, pusher 120 includes two tabs: tab 210 located in a middle portion of pusher 120, and a tab 700 located at an outer portion (in the y-direction) of pusher 120. It is noted that tab 700 is shown but not labeled in FIG. 2. In various examples, tabs 210 and 700 can have equal or different heights h2, ranging from about 1 inch (25.4 mm) to about 1.5 inches (38.1 mm). Additionally or alternatively, tabs 210 and 700 may have different widths along the y-direction, for example, with tab 210 being wider than tab 700. In some examples, the width w2 of each tab 210 and 700 may be from about 0.25 inches (6.4 mm) to about 0.5 inches (12.7 mm). In some embodiments, widths w1 and w2 may be equal or different from each other. In some embodiments, use of two tabs 210 and 700, compared to using just one tab, can provide added stability and strength to pusher 120. The dimensions of internal cavities in the interlock 110 (e.g., the depth and width of cavity 200 along the x and y directions) can be chosen to achieve a secure or tight fit with tabs 210 and 700.

Figure 3A:
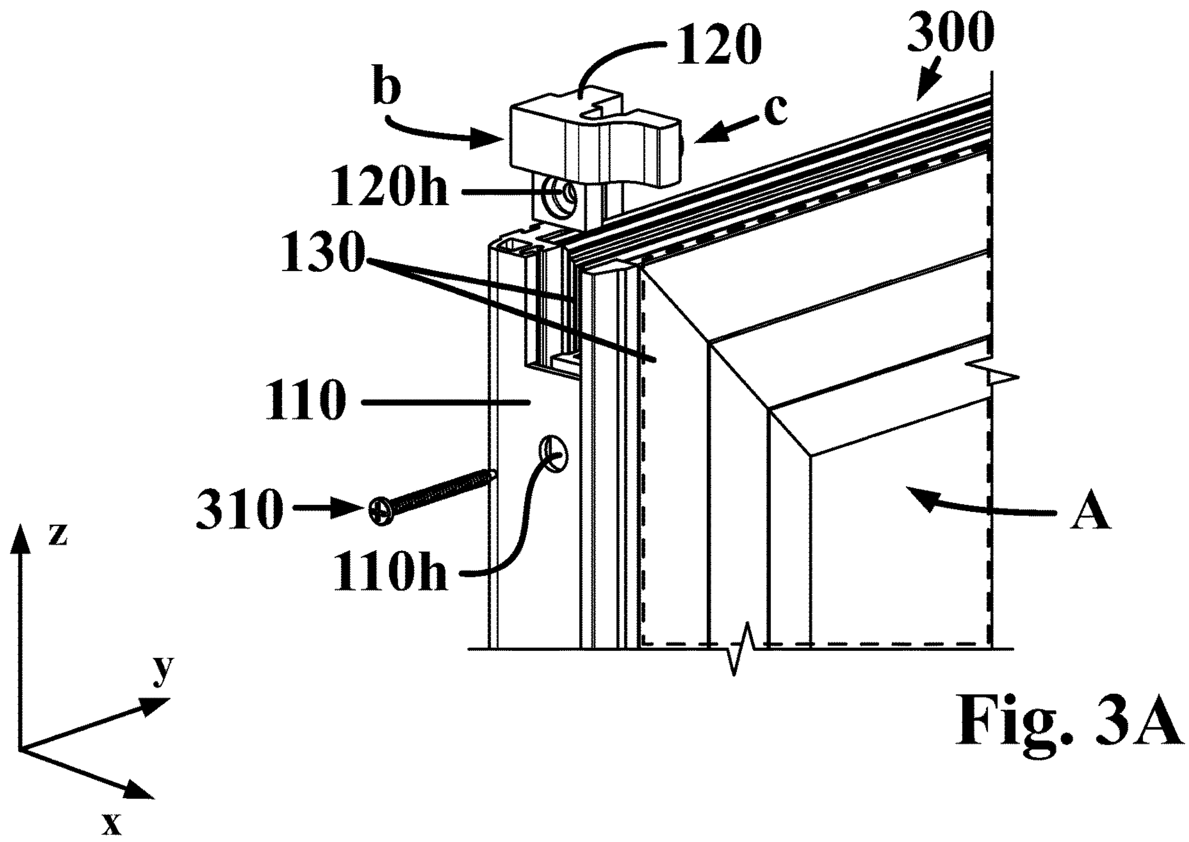
FIGS. 3A-3D are isometric views showing an installation process of a door pusher on a door panel, according to some embodiments.
Figure 3B:
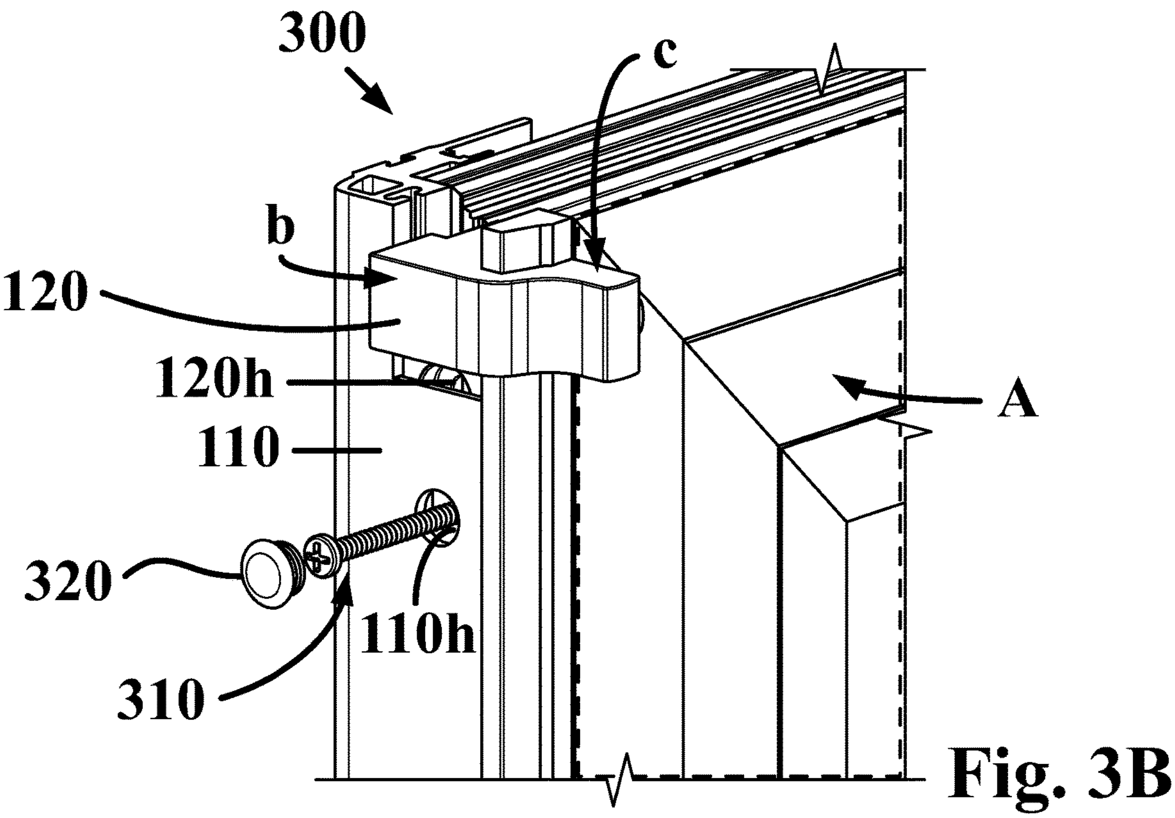
Figure 3C:
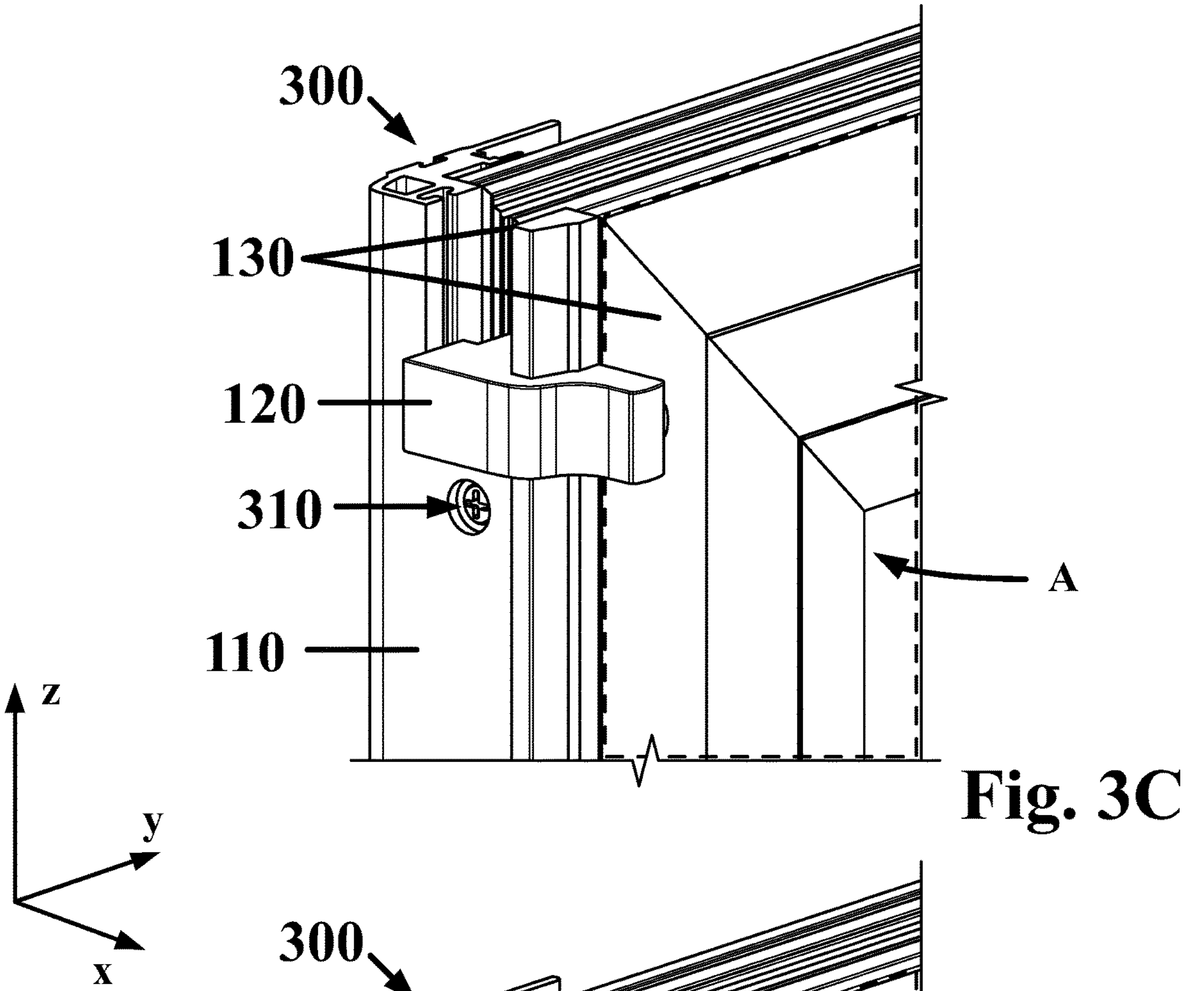
Figure 3D:
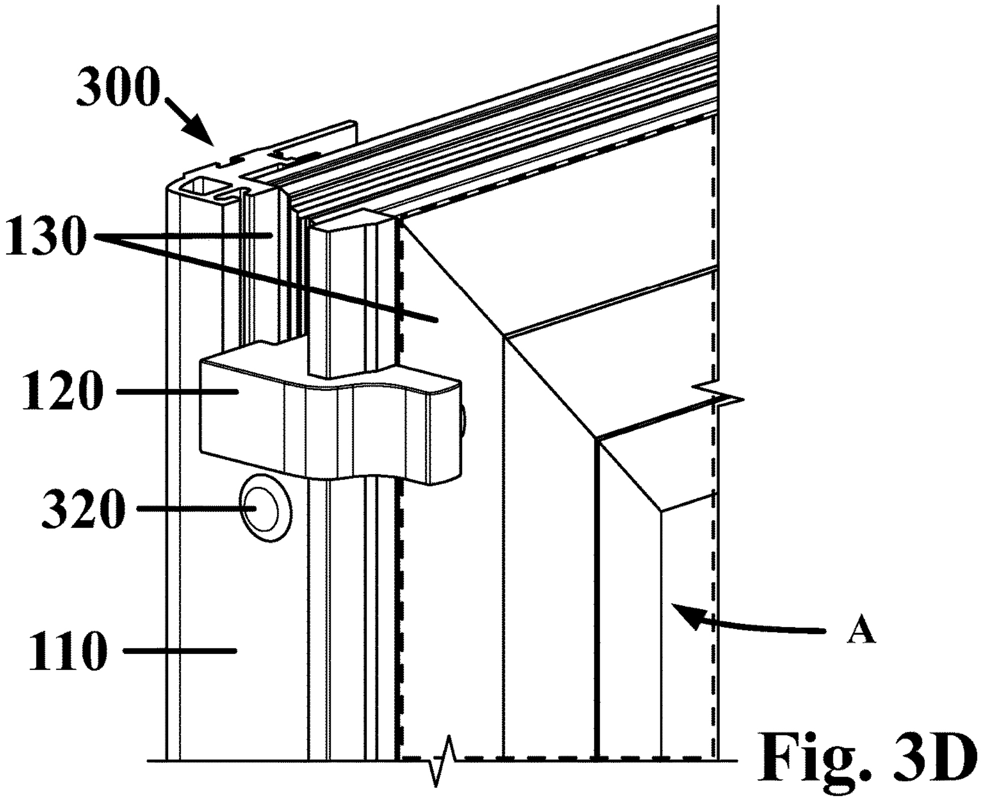
Figure 4:
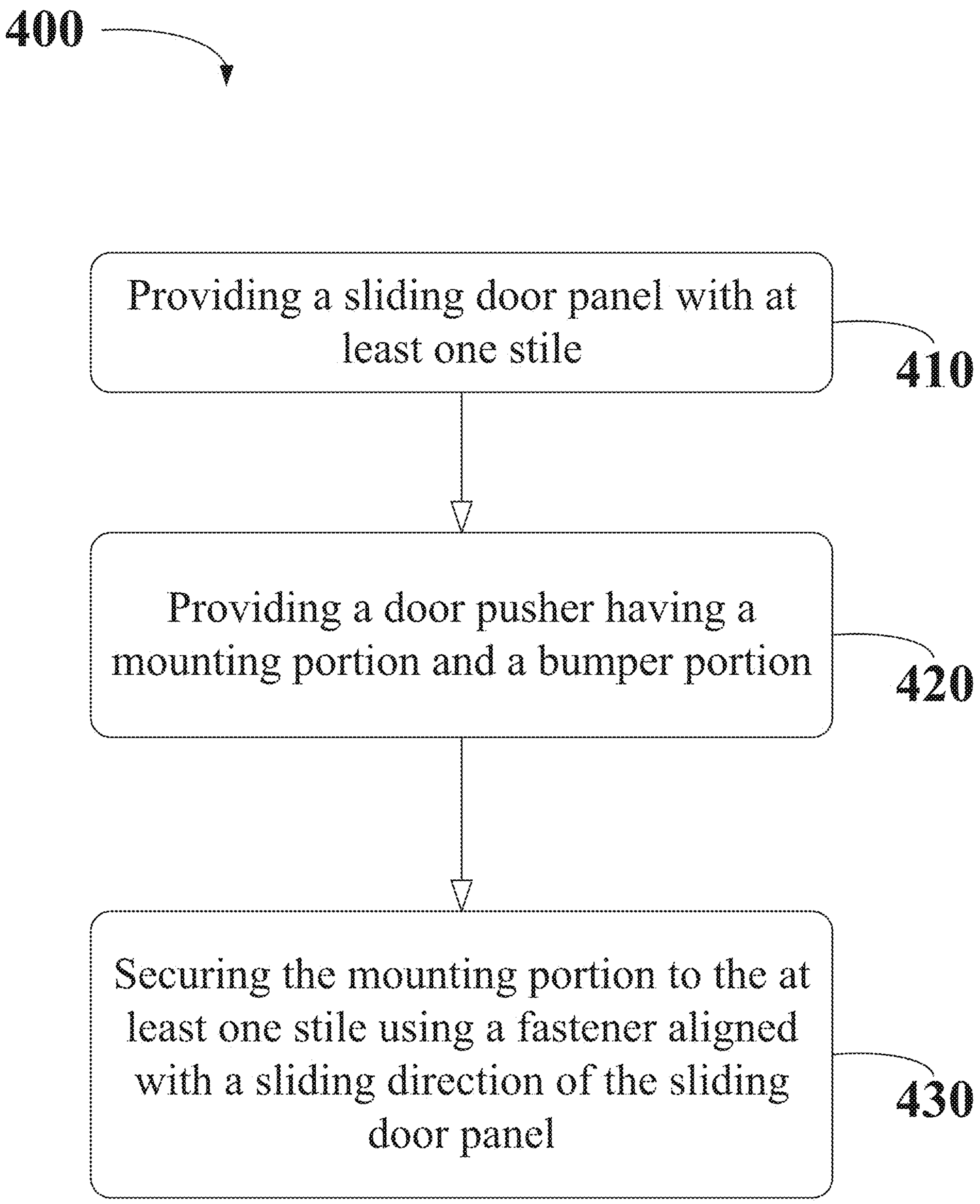
FIG. 4 includes a flow chart of a method of installing a door pusher on a door panel, according to some embodiments.

According to some embodiments, a flow chart of a method 400 for installing the door pusher 120 on a door panel is shown in FIG. 4. Some of the installation steps may be performed simultaneously, or in a different order than those depicted. Alternatively or additionally, one or more other steps may be performed in addition to or in place of the depicted steps. For illustrative purposes, method 400 is described with reference to the embodiments shown in FIGS. 3A-3D.

Method 400 begins with operation or step 410 where a sliding door panel with a stile is provided. In some examples, the term "stile" refers to vertical framing components of the panel located on a perimeter or sides of the panel. For example, a panel 300 with a stile 130 is shown in FIG. 3A. In the depiction of FIG. 3A, the external side A of the panel 300 is also visible.

In operation or step 420, door pusher 120 is provided with the mounting portion b and the bumper portion c, which collectively form door pusher 120. In FIG. 3A, the interlock 110 interfaces with and attaches to the stile 130. In some embodiments, the interlock 110 is configured to snap onto or achieve a secure fit with the stile 130 (e.g., a press fit or a friction fit). By way of example and not limitation, the interlock 110 can feature grooves, protrusions, tabs, or other structural elements that allow interlock 110 to be secured to stile 130 either with or without additional fastening members (e.g., screws or rivets), adhesive, and/or intermediate components or layers. In some embodiments, the interlock 110 may cover at least a portion of an edge of the stile 110. In other embodiments, the interlock 110 and the stile 130 can be formed from a single piece, such that there is no need to attach the interlock 110 to the stile 130.

As discussed above in reference to FIG. 2, door pusher 120 and interlock 110 feature self-aligning holes **120*h* and 110*h*, which align along the y-direction (e.g., the sliding direction of the door panel) when the mounting portion b is fully inserted onto the interlock 110. FIG. 3B shows the mounting portion b of the door pusher 120 partially inserted onto the interlock 110. A fastener 310 can be inserted to secure the door pusher 120 and the interlock 110 once holes 120*h* and 110*h* are aligned according to operation or step 430 of method 400**.

The fully installed door pusher 120 is shown in FIGS. 3C and 3D. In some embodiments, a cap 320 may be installed in hole **110*h* to cover the head of the fastener for an aesthetically pleasing result. According to some embodiments, a center axis of the fastener 310 is aligned with the y-direction (e.g., perpendicular to the stile 130), which, as discussed above, corresponds to the sliding direction of the door panel. The fastener 310 secures the door pusher 120 to the stile 130 and/or the interlock 110**.

As shown in FIGS. 3B-3D, the bumper portion c of door pusher 120 is designed to extend sideways along the x-direction (e.g., substantially perpendicular to external surface A) and wrap around a side portion of the interlock 110 in the y-direction. A top-down view of the configuration is provided in FIG. 1. In some embodiments, the bumper portion c may or may not extend in the y-direction beyond an edge of interlock 110 (e.g., to cover an outer surface of the stile 130). According to some embodiments, securing the door pusher 120 to an edge of the panel (e.g., directly on the interlock 110) can reduce a total stacking length of the door panels when fully opened, as will be discussed later with respect to FIG. 5.

Further, the orientation of the door pusher 120 and fastener 310 prevents or minimizes shearing forces exerted on the door pusher 120 or the fastener 310 while the sliding door is being operated. This is because the fastener 310 is aligned with or parallel to the panel's direction of travel—e.g., in the y-direction. This is different from rail mounted bumper configurations in which fasteners for the bumpers are oriented perpendicular to the direction of travel (e.g., in the x-direction). According to some embodiments, aligning the fastener 310 with the panel's direction of travel, as described herein, improves the robustness and longevity of the door pusher 120. Further, because the door pusher 120 is attached to an edge of the panel and not on the external surface A of the panel (e.g., on a front or back surface of the stile), the door pusher 120 is less visible and more discrete, compared to previous designs. Mounting the door pusher 120 on the panel edge (e.g., attached to the stile 130 via the interlock 110), as described herein, provides a mechanical advantage and is more compact, compared to rail mounted bumpers.

Figure 5:
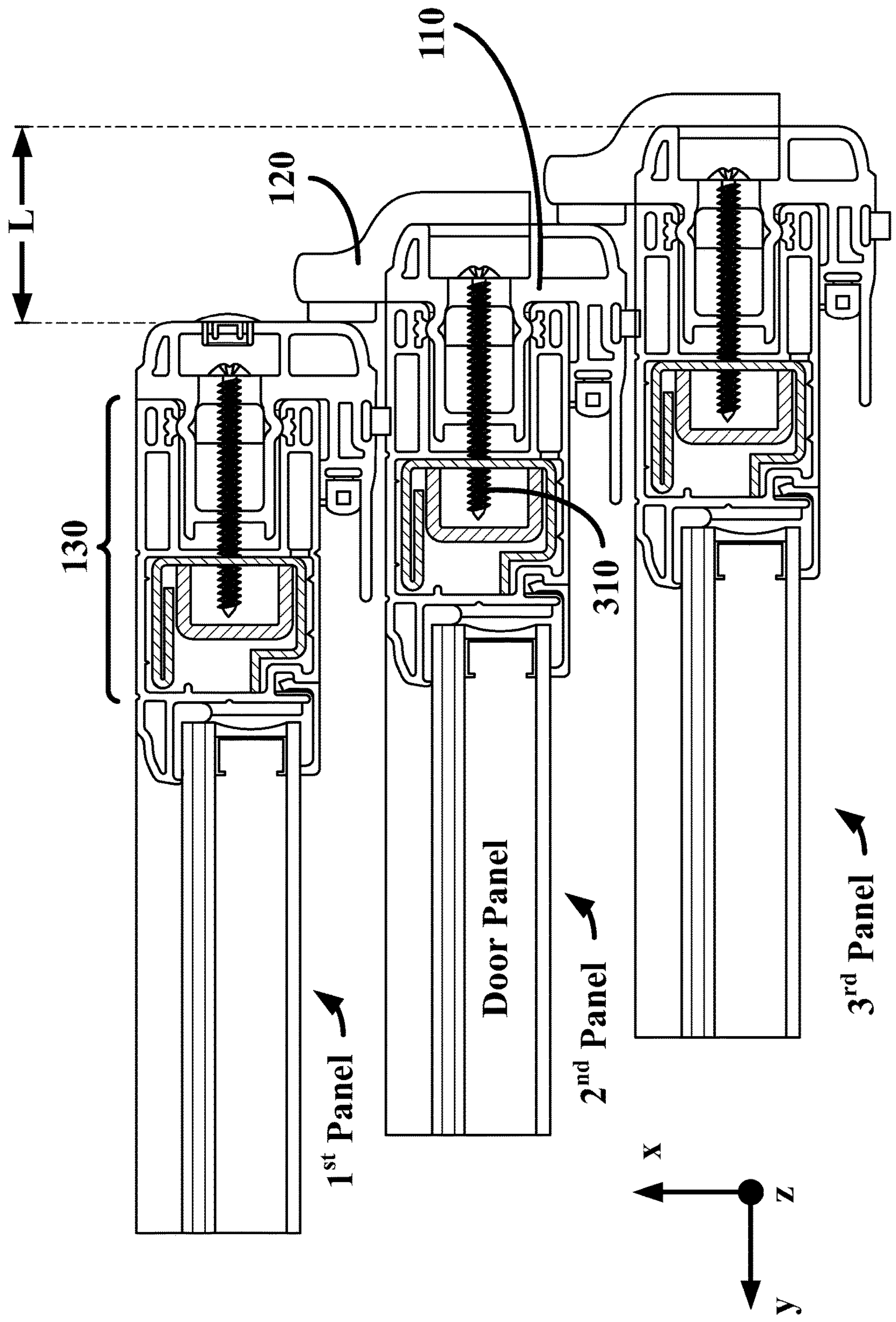
FIG. 5 is a top view of a three-panel sliding door with door pushers installed thereon, according to some embodiments.

The operation of a three-panel sliding door equipped with the door pushers 120 will be described with reference to FIG. 5. Although FIG. 5 shows a three-panel sliding door, the principle of operation described herein applies to sliding doors with fewer (e.g., two) or additional sliding panels (e.g., more than three). Starting from a fully closed position where all the panels are fully extended, a user may begin applying force to the first panel in a direction opposite to the y-direction. It is noted that the first panel is not equipped with a door pusher; however, the first panel has an interlock 110 attached to its stile 130. The first panel slides (e.g., along a track) over or adjacent to the second panel until its interlock 110 contacts the door pusher 120 on the second panel. Once contact is achieved, both panels can begin to move together in the same direction—i.e., opposite to the y-direction. The first and the second panels move over or adjacent to the third panel until the interlock 110 of the second panel contacts the door pusher 120 on the third panel, at which point the third panel can begin to move, or the panels may be in a fully open position.

According to some embodiments, a total stacking displacement L of the sliding door shown in FIG. 5 can be substantially less than that achieved with rail mounted bumpers. In some embodiments, the total stacking displacement L reduction achieved with door pushers 120 can be 50%, 75%, or more, for example, depending on how or where the rail mounted bumpers are installed.

Figure 6:
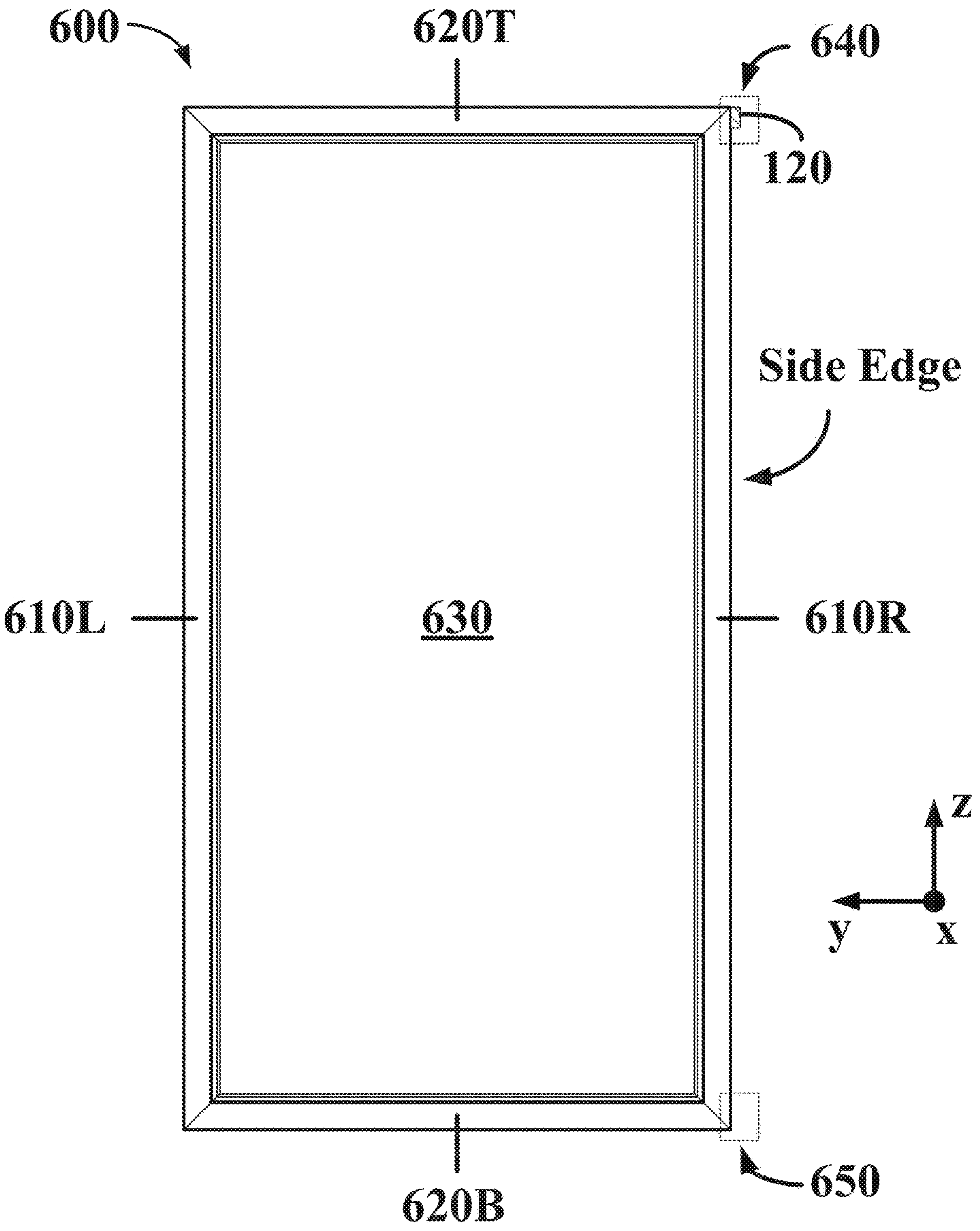
FIG. 6 is a front view of a door panel, according to some embodiments.

In some embodiments, the location of the door pusher 120 can be at the top corner of the door panel, at the bottom corner of the door panel, or at any convenient or preferred location. FIG. 6 is a front, schematic view of a door panel 600, in accordance with certain examples. The door panel 600 includes stiles 610L and 610R, a top rail 620T, a bottom rail 620B, and a central region 630 (e.g., made of glass). The door panel 600 also includes a door pusher 120, as described herein, mounted to a side edge of the door panel 600. For example, the door pusher 120 can be located near a top edge 640 and/or a bottom side edge 650 of the door panel 600. In various examples, the side edge includes or is formed by an interlock 110 (not shown in FIG. 6) as described herein. The door pusher 120 can be secured to the stile 610R and/or the interlock 110 (not shown in FIG. 6) using a fastener.

Table 1 provides ranges for certain dimensions associated with pusher 120, in accordance with some embodiments. Each listed value can be a minimum, maximum, or average value. Various embodiments include any parameter value (e.g., integer or decimal value) within the cited ranges. For example, the height h1 can be greater than, greater than or equal to, less than, less than or equal to, or equal to 0.5, 0.6, 0.7, . . . , or 1.0 inches. Express support and written description of these parameter values for each parameter are hereby represented.

TABLE 1

Exemplary dimensions for pusher 120.

| Element | Range |
|---|---|
| Height h1 (see FIG. 1) | 0.5 inches (12.7 mm)-1.0 inches (25.4 mm) |
| Width w1 (see FIG. 1) | 0.25 inches (6.4 mm)-0.5 inches (12.7 mm) |
| Height h2 (see FIG. 7) | 1.0 inches (25.4 mm)-1.5 inches (38.1 mm) |
| Width w2 (see FIG. 7) | 0.25 inches (6.4 mm)-0.5 inches (12.7 mm) |

The construction and arrangement of the elements of the apparatus as shown in the exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited.

Further, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes, and omissions may be made in the design, operating conditions, and arrangement of the exemplary embodiments without departing from the spirit of the present subject matter.

The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

It should be also understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention.

What is claimed is:

1. An apparatus comprising:
- a sliding door panel comprising:
  - at least one stile; and
  - a door pusher comprising:
    - a mounting portion secured to the at least one stile using a fastener aligned with a sliding direction of the sliding door panel; and
    - a bumper portion configured to contact an edge of an adjacent sliding door panel;
- wherein the sliding door panel comprises an interlock attached to the at least one stile, and
- wherein at least one of (i) the interlock defines at least one internal cavity and the mounting portion comprises at least one tab inserted into the at least one internal cavity, or (ii) the interlock defines a vertical slot at an end of the interlock, and the mounting portion is disposed within the vertical slot.

2. The apparatus of claim 1, wherein the at least one stile comprises a first stile on one side of the sliding door panel and a second stile on an opposite side of the sliding door panel.

3. The apparatus of claim 1, wherein the sliding door panel is configured to slide on a track in the sliding direction.

4. The apparatus of claim 1, wherein the interlock defines the at least one internal cavity and the mounting portion comprises the at least one tab inserted into the at least one internal cavity.

5. The apparatus of claim 1, wherein the interlock defines the vertical slot at the end of the interlock, and wherein the mounting portion is disposed within the vertical slot.

6. The apparatus of claim 1, wherein the interlock defines a first hole and the mounting portion defines a second hole aligned with the first hole.

7. The apparatus of claim 6, wherein the first hole and the second hole are configured to receive the fastener.

8. The apparatus of claim 1, wherein the fastener comprises a screw.

9. The apparatus of claim 1, wherein the bumper portion extends away from the stile in a direction perpendicular to a plane defined by the sliding door panel.

10. The apparatus of claim 1, wherein the mounting portion and the bumper portion comprise a unitary construction.

11. The apparatus of claim 1, further comprising a cushioning material attached to the bumper portion for achieving the contact with the adjacent sliding door panel.

12. A method of manufacturing a door, the method comprising:

providing a sliding door panel comprising at least one stile;

attaching an interlock to the at least one stile;

providing a door pusher comprising:

a mounting portion; and a bumper portion configured to contact an edge of an adjacent sliding door panel; and securing the mounting portion to the at least one stile using a fastener aligned with a sliding direction of the sliding door panel wherein at least one of:

(i) the interlock defines at least one internal cavity, wherein the mounting portion comprises at least one tab, and wherein securing the mounting portion comprises inserting the at least one tab into the at least one internal cavity, or (ii) the interlock defines a vertical slot at an end of the interlock, and wherein securing the mounting portion comprises positioning the mounting portion within the vertical slot.

13. The method of claim 12, wherein the interlock defines the at least one internal cavity, wherein the mounting portion comprises the at least one tab, and wherein securing the mounting portion comprises inserting the at least one tab into the at least one internal cavity.

14. The method of claim 12, wherein the interlock defines the vertical slot at the end of the interlock, and wherein securing the mounting portion comprises positioning the mounting portion within the vertical slot.

15. The method of claim 12, wherein the interlock defines a first hole and the mounting portion defines a second hole aligned with the first hole, and wherein securing the mounting portion comprises inserting the fastener into the first hole and the second hole.

16. The method of claim 12, wherein the fastener comprises a screw.

17. A method of operating a sliding door system, the method comprising:

providing a plurality of sliding door panels, wherein at least one of the sliding door panels comprises:

at least one stile; and a door pusher comprising:

a mounting portion secured to the at least one stile using a fastener aligned with a sliding direction of the sliding door panel; and a bumper portion configured to contact an edge of an adjacent sliding door panel from the plurality of sliding door panels;

sliding the adjacent sliding door panel; and pushing the at least one of the sliding door panels by contacting the edge of the adjacent sliding door panel to the bumper portion;

wherein the at least one of the sliding door panels comprises an interlock attached to the at least one stile, and wherein at least one of (i) the interlock defines at least one internal cavity and the mounting portion comprises at least one tab inserted into the at least one internal cavity, or (ii) the interlock defines a vertical slot at an end of the interlock, and the mounting portion is disposed within the vertical slot.

* * * * *